July 23, 1946.　　　　H. M. SUTTON　　　　2,404,414
METHOD AND APPARATUS FOR REMOVAL OF HEAVY OBJECTIONABLE
MATERIAL FROM CEREALS, LEGUMES, AND OTHER FOOD PRODUCTS
Original Filed Jan. 17, 1941　　5 Sheets-Sheet 2

Inventor
H. M. Sutton
By F. E. Wood Executor
Pattison, Wright & Pattison
Attorneys July 23, 1946. H. M. SUTTON 2,404,414
METHOD AND APPARATUS FOR REMOVAL OF HEAVY OBJECTIONABLE
MATERIAL FROM CEREALS, LEGUMES, AND OTHER FOOD PRODUCTS
Original Filed Jan. 17, 1941 5 Sheets-Sheet 5

Patented July 23, 1946

2,404,414

UNITED STATES PATENT OFFICE 2,404,414

METHOD AND APPARATUS FOR REMOVAL OF HEAVY OBJECTIONABLE MATERIAL FROM CEREALS, LEGUMES, AND OTHER FOOD PRODUCTS

Henry M. Sutton, deceased, late of Dallas, Tex., by Frank E. Wood, executor, Dallas, Tex., assignor to Sutton, Steele & Steele, Incorporated, Dallas, Tex., a corporation of Texas Continuation of application Serial No. 374,920, January 17, 1941. This application December 4, 1943, Serial No. 512,933

14 Claims. (Cl. 209—467)

This patent application is a continuation of the Henry M. Sutton pending patent application Ser. No. 374,920, filed January 17, 1941, and bearing like title.

This invention relates to improvements in the method and apparatus for the removal of heavy objectionable material from cereals, legumes and other food products, and the object of the present invention is to accomplish this with the following new method and apparatus.

The present method and apparatus can be utilized for the separation and cleaning of many different materials or products. To enable a clear understanding of the method and apparatus it is hereinafter described in respect to the removal of foreign substances from peanuts or the like, for which use the invention is particularly well suited.

To bring out the advantages and improvements of the present invention which constitute an advancement in the art the methods and machines heretofore used in connection with the harvesting and cleaning of peanuts and other legumes by separating foreign substances therefrom will be explained.

Peanuts and other legumes are harvested by pulling the entire plants with their roots and passing them through a suitably constructed thrasher which removes the nuts or other products from the plants or vines. By reason of this manner of handling, rocks, balls of clay, pieces of metal, glass and other heavy foreign material which cling to the roots are carried through the thrasher and although the vines, chaffs and free hulls are shaken loose and blown off, the heavy rocks, metal particles, glass and clay remain. The thrashed products are taken to the mill or processing plant for final cleaning by shaker screens or fanning separators combining screens. Large sticks, clods, metal and rocks are screened out over a perforated screen which has openings small enough to prevent large contaminations from passing through but small enough to allow passage of good stock. The material then passes over a screen with smaller openings which in turn allows fine gravel, sand and dirt to pass but which retains the good material on its surface. The sand screen is usually directly below the top or scalping screen. Air suction on the screens is sometimes employed to remove dust and chaff.

The so-called finished product is now free of large undesirable particles and fine dirt but it still contains all of the stones, glass, metal, etc. which are of the same size as the good product.

In other milling operations such as the manufacture of corn meal, flour, hominy grits, and cereals, these contaminations are always present in varying degree. Magnets are used in some instances to remove metal, which is magnetic but the magnet cannot remove rock, clay balls, glass and various metal particles which are non-magnetic.

If this material is not effectively removed before processing, damage may be caused to the machinery in the mill and if it is not finally removed before the edible product is packed, serious injury may befall the consumer.

My invention relates to the efficient and economical removal of these contaminations from all dry food products in one operation.

In the present state of this art, there are two conventional pneumatic methods used. The first and most widely used is the air leg or aspirator which attempts to lift the good material through a pipe leaving the heavier stones and metal behind. The objection to this type of unit is well known, namely, it is necessary to use air at high velocities to lift all of the material except the stones. It is unable to efficiently remove light particles of glass, small stones, etc. for this reason. The small particle caught in a mass of heavier particles is most likely to be drawn upward and lost with the good material. A particle must either go up or down. If it is of intermediate weight and remains suspended in air, other particles of the same characteristics will gradually surround it until the velocity in the pipe increases to such an extent that all of the material including stones and good product are taken out at one time. It cannot cope with variation in particle shape. A flat, light piece of glass presented to the air current with its flat side down will be taken upward immediately with the good material. If lower velocities are used, too much good material stays with the stones, glass and metal and a practical separation is not therefore accomplished.

The other method which is less widely used on account of its cost but which is far more efficient than the aspirating or suction device, utilized a pneumatic or gravity table, using the air flotation principle. This equipment actually floats material in air as if in water. The air is used under pressure and there are no high velocity air currents to disturb the separation. The heavy material sinks to the bottom of the mass and works gradually upward and side-wise until it is discharged at the end along with a mixture of good heavy material. The chief advantage of the gravity separator over the aspirator units lies in the fact that it is more able to separate minute particles of glass, stone, and other heavy contaminations since it does not use high velocity air currents. If material to be removed is very near the same density of the good material it is not necessary for it to separate immediately. It simply lies on the surface of the separator deck and moves forward gradually until it is at the point of discharge. Equipment used in this process is such as described and substantially as shown in Patent No. 1,710,521 granted to Sutton et al., April 23, 1929.

The disadvantage of the use of this method and type of separator is two-fold. First, although the removal of heavy contaminating material from the bulk of the good material is perfect, the rocks, stone, metal, and glass produce contains a quantity of good material which is near the weight of the heavy contaminating material. Cutting fingers are set to cut out the stone product with the loss of as little good product as possible but if there is a fluctuation in the quantity of rocks, metal, etc., contained in the feed going to the machine some of this foreign material will discharge to the wrong side of the cutting finger and contaminate the material which is normally clean. For this reason it is necessary to have an operator watch the table carefully and make adjustments when necessary.

Even if the adjustments are kept perfect, there is always a mixture of good material which is almost as heavy as the contaminations which report in small quantities with the contamination. This heavy and discharge stream must be either constantly retreated, or if economical, just be sorted by hand. In most instances the material making up this discharge stream is thrown away which results in a sizable loss of material during a year's operation.

The other objection to the gravity or air flotation table is the limitation in capacity. Material is confined on two sides and it can discharge in only one direction. The feed therefore cannot be heavy.

The present invention overcomes the disadvantages of both the conventional aspirator and the gravity separator. For years the apparatus and the process used by the inventor utilized the well known eccentric and pitman for producing the necessary reciprocation of the deck and the materials thereon being processed, substantially as shown in patent to Sutton, Steele and Steele No. 1,710,521 Y table granted April 23,1929. The above mentioned eccentric and pitman is necessarily limited in speed, i. e., ranging in practice from two hundred and eighty to four hundred twenty strokes per minute and the length of the stroke being three-eighths of an inch. The inventor has found this to be a comparatively slow oscillatory movement. In working out the present improvement the inventor discovered that as the vibrations of the tables are increased, the air pressure passing through the perforated deck to lift the material thereon can be greatly diminished. This higher speed agitation is very important in aiding rapid settlement of the heavier elements through the lighter materials in the mass. To increase the frequency has the same effect as to increase the air. Therefore, less air can be used and the separation will more closely approach true flotation as in water, thus increasing the range of materials of very close density which can be separated.

The inventor has also discovered that an added friction value is given to the heavier elements of the mass against the roughened surface deck by the weight of the over-lying stratus of lighter elements which by their pressure force the heavier elements into contiguous contact with each other and against the roughened surface causing the heavy under-lying stratum to move forward together toward the discharge. It was found in experimenting that if various weight stones were placed only on the deck surface the end raise could be increased to the point where no stones would discharge since by this end raise the conveying action of the high speed shaking mechanism had been counteracted. Then wheat was fed on the deck and the pressure of this grain started the forward movement of the stones. As soon as the feed was reduced, the stones again were stationary. An exaggerated feed brought all stones forward at a rapid rate until all but a few lighter stones were discharged. These light stones remained against the diagonal banking rail and would continue to discharge only if additional stones were added to the feed. There was at times a tendency for some of the heaviest wheat to work forward into the discharge. To remedy this, a specially constructed bar was utilized which extends across the heavy particle discharge end which deflects air coming through the deck surface back against the flow of material upwards but allows stones to escape freely under it. If light stones are blown backward by this action they quickly settle and start forward again in contact with the other heavier elements. The light material which has a tendency to move forward on the surface eventually builds up until it slides off the deck surface downward by gravity toward the light end discharge. This deflector, which is designated as a skimmer, is considered one of the chief features of the improvements of this invention.

At the light end discharge of the deck is provided an adjustable retaining wall extending across the discharge at right angle to the flow of the light material. This tailing riffle can be used to regulate the pressure as above described when working on the removal of heavy materials which are lighter than normal. It also prevents flaky stone or glass from cascading from the feed and getting into the light material discharge. If this material drops too far near the end of the separator it is quickly held by this retaining wall and starts its forward motion under pressure of the lighter over-lying stratus. This riffle, or retaining wall, can also be used to regulate the capacity making the operation fully automatic. This separator does not allow an intermediate or second grade product to be discharged. If the material lacks weight enough to climb through friction with the roughened surface it maintains its position on the deck of the surface and moves forward by contiguous contact with other heavier elements as above described.

Another important feature of this invention is the increased capacity which can be obtained on this separator. Except for the heavy end discharge point there is no banking rail to retard the movement of the light material in its flow backward and with the degree of end raise used the light material flows freely and unobstructed. Capacities were obtained five to ten times greater for the same working deck area as can be obtained on the standard gravity separator hereinbefore referred to.

The high speed longitudinally vibrating or trembling action is regarded as an important part of this invention. The use of a roughened surface which imparts a hold to the material on the lower stratum which combined with normal friction of the heavy material aids in its up-hill travel, is also regarded as important.

The disposition of air under this blowing bar is also regarded as another important feature in this improvement.

Furthermore, the special construction of the deck surface is regarded as another important feature of this invention which will specifically be described hereinafter.

A further and modified construction is shown and described, wherein the blowing bar or deflecting pneumatic skimmer is automatic in its action as will be described hereinafter.

Additional features of the invention will be referred to hereinafter.

Figure 1:
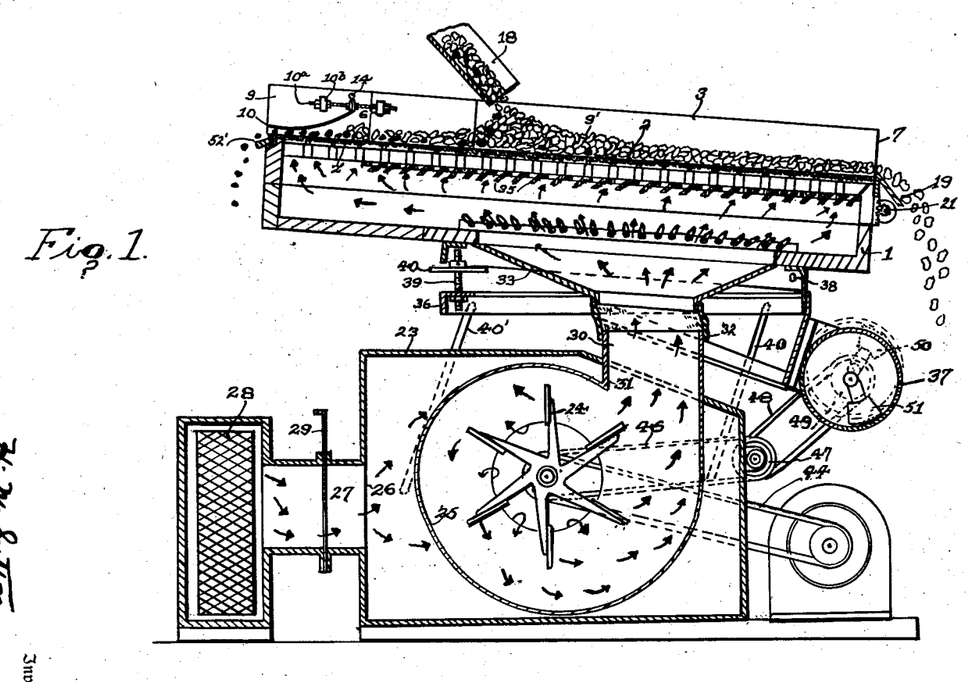
Fig. 1 is a longitudinal vertical sectional view through the machine.
Figure 2:
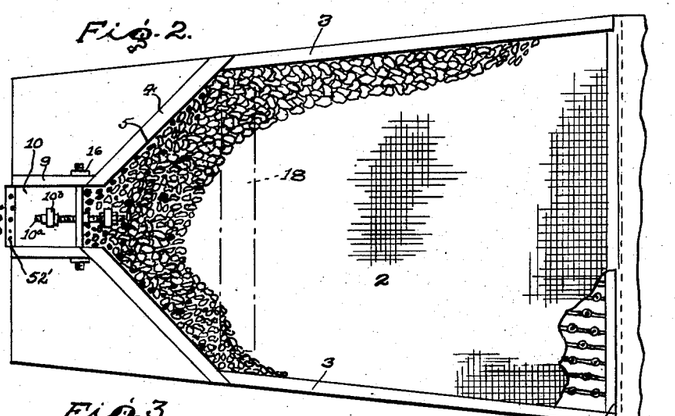
Fig. 2 is a top plan view with the deck or covering being partly broken away.

Referring now specifically to the drawings the deck is composed of frame-work consisting of an air chest 1, which has a deck 2 which consists of a suitable covering which will be specifically explained hereinafter. Said deck has upwardly extending sides 3 and these sides converge toward the center of the deck as shown at 4. This forms an outlet 5 through which the heavier particles 6 of the mass escape from the deck 2. The opposite end 7 of this deck is provided with a vertically extending wall 8 that spans said end 7. This end 7 will for convenience be referred to as an outlet for the lighter particles of the mass 9', while the opposite converged end 4 will for convenience be termed the outlet for the heavier particles. Said end 4 is formed by the short parallel walls 9. and a skimmer bar or deflecting pneumatic skimmer 10 is vertically movable between said walls 9. The bar 10 is broadly termed as a skimmer bar for the want of a better term. It might be called a blowing bar because it directs the air below it through said outlet 5 and to some extent controls the air passing, or blowing through said outlet passage. Said bar is in the form of a square bar as shown in Fig. 2. This bar 10 has its bottom 11 curved as shown and its inner end 12 is attached to and supported by an oscillating movable member 13 which carries at its upper extremity an eye 14 which is engaged by a rod 15 that has its ends 16 fastened or clamped to the side walls 9. As shown by arrows the air is divided and caused to flow in opposite directions from about the center of said skimmer bar 10. Therefore the air is controlled by said bar and it controls also the speed of and the amount of escaping heavier particles 6 of the mass between the walls 9. The bar 10 oscillates up and down by swinging on said eye 14.

Attached to the upper end of the bar 10 is a rod 10ª that carries on its ends weights 10ᵇ that are adjustable on said rod 10ª and by these weights the skimmer bar 10 can be balanced according to the requirements of the material being operated upon.

Said mass is fed through a chute 18 that declined in the direction of the flow of the lighter particles and said chute extends substantially clear across the deck, and it is preferably positioned nearer the end 5 than the end 7.

The wall 8 at the outlet for the lighter particles is provided with an apron 19 and a gear rack 20 and a gear wheel 21 and a hand wheel, not shown, for vertically adjusting the wall 8 and thus controlling the depth of the mass maintained on said deck 2.

It will of course be understood that the depth of the mass on the deck depends upon the character thereof that is being separated and cleaned. Attached to the air chest and hence with said deck 2 is a fan chest 23 that carries a suitable fan 24 that is contained in a suitable fan housing 25 that has the usual air inlet 26 that is connected by a passage 27 with an air filter 28. The passage 27 has the usual control shutter 29. The outlet 30 of said fan housing extends outwardly through the chest 23 as at 31 and is provided with a flexible connection 32 which attaches it to the member 33 which is connected to the air chest 1. Carried by the lower portion of said air chest where it connects with the member 33 are a plurality of adjustable louvres 34 for directing the air to the baffles 35 which are located below and preferably separated from said deck 2. The air flows in the direction indicated by arrows from the fan to the deck 2.

Attention is particularly directed to the fact that the baffles 35 do not extend below the blowing bar 10 and that therefore the air freely flows through the deck area 2' into the space under said bar 10. The purpose of this is to blow out the heavy particles and thus prevent any choking of the apparatus.

The air chest 1 and the deck 2 carried thereby are attached to a chassis or member 36. One end 37 of said member 36 is hinged at 38 to the said air chest, and its opposite portion 36 is adjustably connected with the air chest 1 by a vertical screw 39 which carries a suitable handle 40. The purpose of this adjustment is to increase or decrease the inclination of the deck 2.

Suitable vertical spring metal rods 40' have their upper ends connected with said member 36 and their lower ends connected with the chest 23, whereby said parts 1, 2 and 36 are longitudinally movable. These parts will hereafter be again referred to.

Attached to the member 36 is what may be termed a high-speed longitudinally vibrating or trembling mechanism 37. This trembling is longitudinal of the deck 1, and its purpose is to cause the said deck to vibrate or tremble longitudinally. The spring rods 40 are set at an inclination toward the wall 8 whereby the said movement lifts the mass 9' slightly. This causes the heavier particles to fall through the lighter particles and thus finally reach the deck and the heavier particles are carried toward and escape through the outlet passageway 5.

For the purpose of aiding the movement of the heavier particles on said deck 1, said deck has its top surface 41 slightly roughened to increase the frictional coefficient of the heavier particles of the mass therewith. The deck is composed of woven wire, and it has the warp strands 41' thereof crimped over the weft strands 42 thus producing a very rough upper surface as compared with the ordinary weaving of wire screening which has both strands of the wire in the same plane which produces a comparatively smooth surface. As previously stated my screen is preferably additionally roughened substantially as shown at 43.

In the accompanying drawing Fig. 1, the power for operating the devices is derived from a driving element—preferably electrical—which has a belt 44 that passes around the shaft 45 and a belt 46 from said shaft 45 to a shaft 47 and a belt 48 to a shaft 49. This device carries weights 50 and 51 which are so geared up together that when rotated rapidly by means of a suitable driving mechanism, the weights are out of balance with each other in the horizontal line of movement, but are in perfect balance in a perpendicular line of the same. There are many devices of this kind on the market for the purpose of causing a rapid trembling or vibrating movement, for instance the well known Ajax-Shaler shaker made by Ajax Flexible Coupling Co., Westfield, N. Y. In the present invention it is necessary that this device be set so that the out of balance is in a longitudinal line with the deck.

As clearly shown in Fig. 1, below the deck 2 under the skimmer bar 10 at 2" the baffles 35 are omitted to permit the air at that point free to blow the lighter particles back, and the baffles 35 are omitted throughout that part which extends beyond the wall which permits the air to freely blow the heavy particles from the outlet to prevent any clogging of the outlet by them and they flow freely over the skirt rail 52'.

It will be observed that the baffles 35 deliver the air diagonally against the under side of the deck 2 in the direction of the flow of the lighter particles, while the heavier particles engage the rough surface of the deck and they are propelled by the high-speed movement of the deck into the narrow outlet opening in which the skimmer bar 10 is located.

It will also be observed that the converging walls 4 form banking bars between which the heavy particles are crowded and against which they bank. The action of the skimmer or blowing bar is very different from prior devices known to the inventor. In the present instance is used an expanded draft of air at the outer edge of the skimmer or blowing bar and the intensity of the draft increases as the distance between its under side and the deck diminishes. The feature of the skimmer or blowing bar 10 and the converging walls 4 are important. The proper regulation of the distance the blowing bar 10 is spaced above the deck surface is such that nothing but the heavy elements pass under it and are discharged through the opening, while the lighter particles are crowded back and finally are discharged over the wall 8 at the opposite end of the deck.

It should be understood that the separation of the material in the manner described is accomplished by the high-speed longitudinal movement alone which enables the small amount of air to cause the mass to become extremely liquid throughout the entire mass without the necessity of varying the relative size of the air openings in the deck. This is a novel construction, operation, and method in separators. It makes the process of controlling the air automatic.

Figures 3, 4, 5:
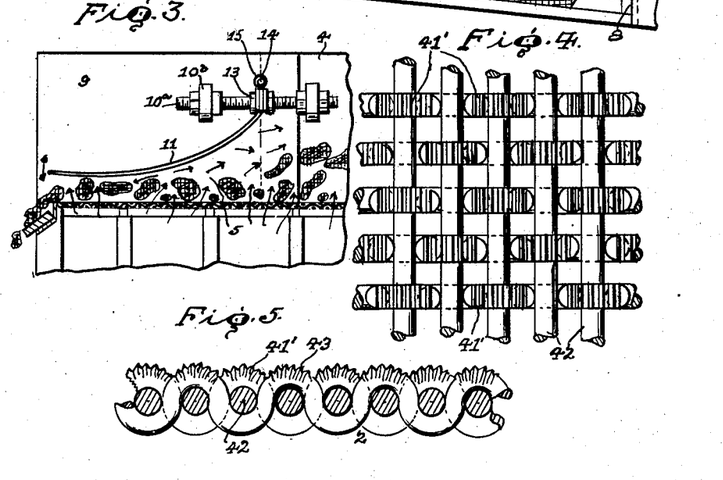
Fig. 3 is an enlarged detail view in vertical section illustrating the preferred form of skimmer bar.
Figs. 4 and 5 are extremely enlarged detail vertical sectional and plan views illustrating the deck.

The radius of the curved under side of the skimmer bar should be the segment of a true circle because the construction shown in Figs. 1 and 3 operates better when so shaped. Placed at the extremity of the skimmer or blowing bar 10, a suitable skirt rail 52' is provided, said rail being preferably declined.

Figure 6:
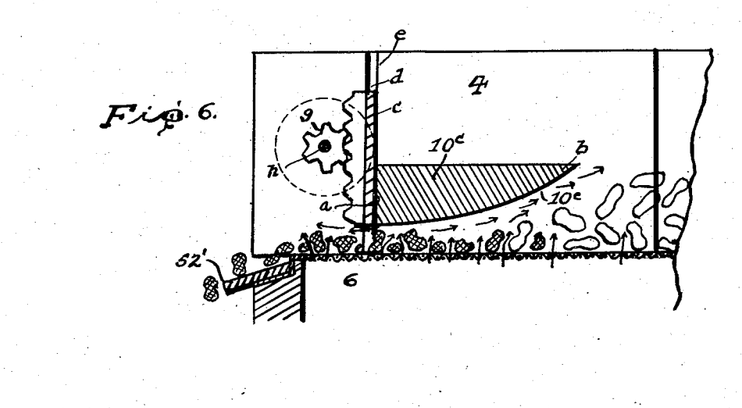
Fig. 6 is a fragmentary enlarged vertical sectional view showing a modified form of skimmer bar.

In Fig. 6 is shown a modified form of skimmer bar which consists of a bar 10c having its under side 10e curved from its outer end $a$ to its inner end $b$. This curve is preferably formed on the arc of a true circle, and the outer end $a$ is attached to a member or wall $c$ which slides in vertical grooves $d$ formed in the inner side of the wall $e$. Attached to the wall $c$ is a vertical rack $f$ which engages a gear wheel $g$. The end of the shaft $h$ that carries said gear $g$ is provided with a hand wheel—shown in dotted lines—which is located outside of the wall $c$. By this construction said skimmer bar 10c is adjusted vertically according to the material being processed. This skimmer bar is not automatic in its vertical movement, as is the skimmer bar 10 illustrated in the other figures of the drawings.

Figure 9:
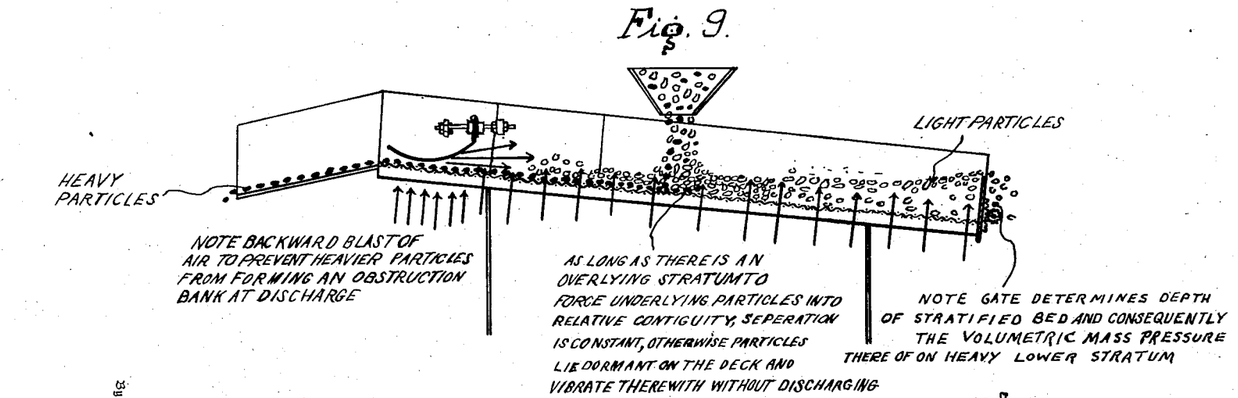
Figs. 9 and 10 are schematic views illustrating the hereinafter described operation of the present improved method.
Figure 10:
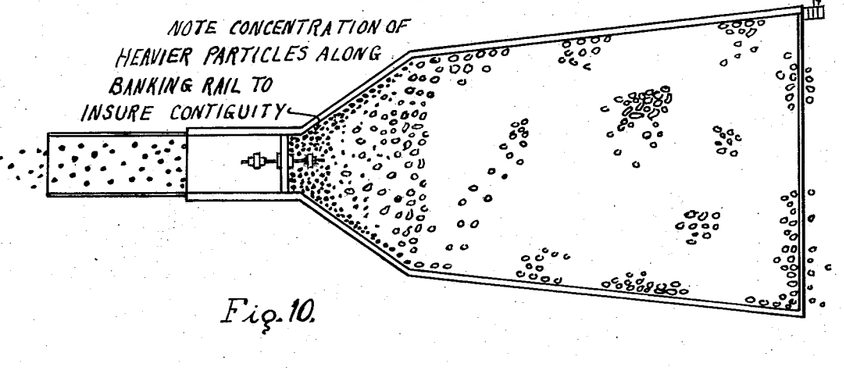

Figs. 9 and 10 of the drawings serve to schematically illustrate and describe the present method. No attempt has been made to properly illustrate the disposition of the particles in Figs. 1 and 2 of the drawings. Obviously the bed of light particles will have an upper surface which is parallel to the horizontal with the result that the bed of light material is of tapered depth with the deep end of the bed at and against the retaining wall or gate at the lower end of the table.

Figure 7:
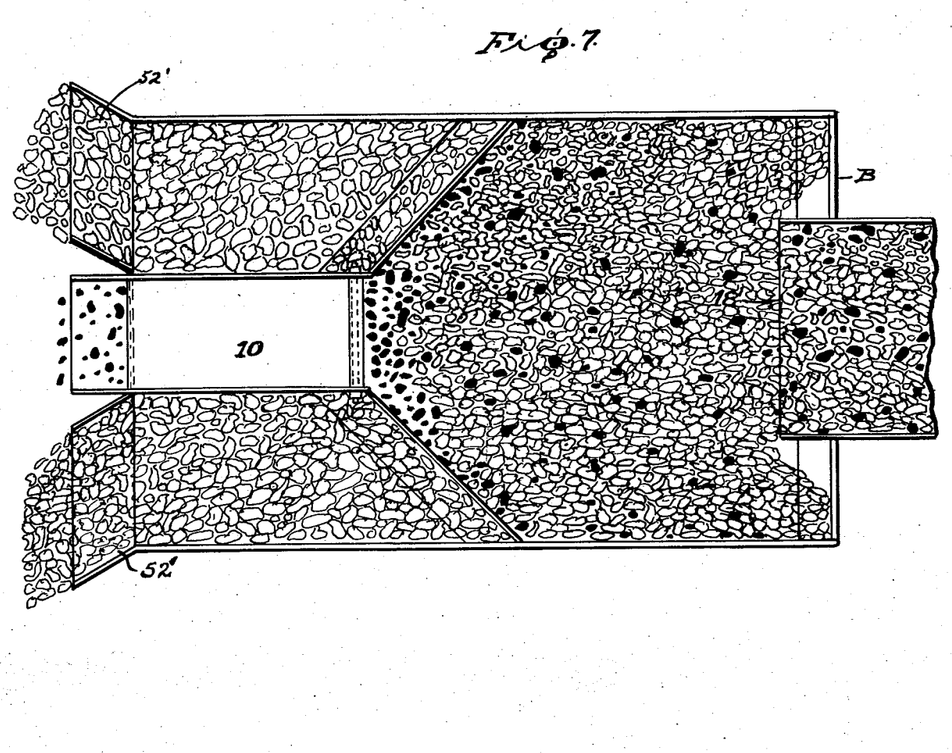
Fig. 7 is a plan view showing a modified form of an apparatus specially designed for separating the meats from the shells of cotton seed.
Figure 8:
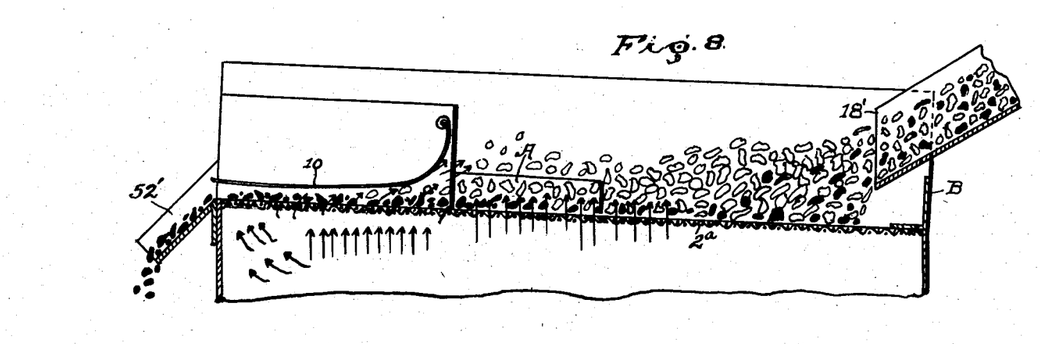
Fig. 8 is a central longitudinal sectional view of Fig. 7.

In Figs. 7 and 8 is shown another modification of the machine illustrated in Figs. 1 to 5 inclusive. This modification consists in lowering the banking bars shown in the other figures of the drawings, and preferably increasing the height somewhat of the walls 4, and instead of placing the feed 18' intermediate the ends of the machine as shown in Fig. 1, it is preferably placed at the receiving end as shown at 18' of Figs. 7 and 8.

This modification is to adapt the machine to the separation of meats from the hulls of cotton seeds. It will be observed that in this modification the machine utilizes the skimmer bar 10 and it works to remove the meats—the heavy parts— of the seed from the hulls and by lowering the banking bars A, the lighter particles—the hulls— flow over the banking bars A, while the meats— the heavy particles—flow under said skimmer bar 10. In operation the cotton seed are previously acted on in the well known method, which makes a mass composed of mixed shells and meats. This mixed mass is fed to the machine, and the heavy particles are separated from the light particles, and these two particles flow to different places.

In this modification the skimmer bar may or may not be provided with weights, according to the character of seed being processed. As here shown the weights are omitted. The deck 2a has its rear end provided with a wall B for holding the mass being separated thereon.

It will be observed that the table or deck has a perfectly blank surface from end to end which is essential because any form of riffle crossing the surface of the table will act to break up the formation of these heavier particles so that their contiguous contact with each other would be broken up into smaller units by means of riffles, which would prevent their concentrated movement in a mass. This new method causes them to concentrate along the sloping bars and as they are continually being added to from fresh material of the kind being fed in with the stock they gradually accumulate enough frictional value with the deck owing to the fact that the impetus of one stone is continually being added to the next, so that finally the forward line of stones or other heavy element overcomes the blowing back action of the skimmer bar and report out under it. This is, in brief, the process of separation here defined. If there is no material fed to the deck, there is no discharge of heavy elements out under the skimmer bar notwithstanding there may be quite a collection of them along the sloping banking bars. Therefore, in a way, the separation depends on the volumetric pressure that is developed by the weight of the material being fed in, which continually adds to the frictional value of the heavier material underlying the stock.

This apparatus and method is merely a cleanup separator either to follow and re-work over part of the product from a regular table, or to be used as a receiving separator at the head of a mill, or to be used as a separator on a mill refuse where usable products can be salvaged from waste materials. Concretely this is its field of operation.

What is claimed is:

1. An apparatus for separating from an intermixed mass of material made up of particles having different specific gravities the lighter particles from the heavy particles comprising, an elongated deck having its longitudinal axis disposed at an inclination to the vertical, means for rapidly and smoothly longitudinally reciprocating said deck to avoid imparting a jerking motion to an abrupt stoppage of movement of said deck, said deck being porous, means for forcing air upwardly through said deck, walls of considerable height extending upwardly from the longitudinal edges of said deck, a wall extending across the lower end of said deck and mounted for vertical adjustment to prevent the escape of material from the lower end of said deck until a bed of predetermined depth has been created on said deck, walls converging towards the center of said deck adjacent the upper end thereof and terminating in an outlet opening, walls extending from said outlet opening to provide an outlet passageway terminating in an open end at the upper edge of said deck, the bottom of said passageway being pervious for the upward passage therethrough of some of the air delivered for upward passage through the deck, a skimmer bar in said passageway and extending entirely there-across and being freely movable vertically in respect to the bottom of said passageway, and the bottom face of said bar being formed to direct the air which enters upwardly through the porous bottom of said passageway horizontally both outwardly and inwardly in respect to said passageway.

2. An apparatus for separating light from heavy particles of an intermixed mass of material comprising, an elongated pervious deck, means for longitudinally reciprocating said deck in a manner to prevent any bumping or jerking action, means for forcing air upwardly through said deck, an elongated narrow walled and covered outlet passageway at one end of said deck for the discharge of heavy material, the cover of said passageway being movably mounted to swing upwardly from the bottom of said passageway, the bottom of said passageway being pervious to permit the passage of air upwardly therethrough, and the under side of said passageway cover being curved to present a convex shaped surface opposed to the bottom of said passageway, and separate means for permitting the escape of lighter material from said table.

3. A construction such as defined in claim 2, wherein, the lighter material escapes from the end of said table at opposite sides of the outlet passageway for the heavy material.

4. A construction such as defined in claim 2 wherein, means is provided for crowding and concentrating the heavy material toward and in front of the inlet end of said outlet passageway.

5. A construction such as defined in claim 2 wherein, the deck longitudinally is vertically inclined and at its lower end is provided throughout its width with a vertically disposed wall mounted for vertical adjustment to selectively create on said deck a bed of material of predetermined depth, and the upper end of said deck having inwardly converging walls to crowd and concentrate the heavy material toward the inlet end of said heavy material outlet passageway.

6. An apparatus for separating from an intermixed mass of material made up of particles having different specific gravities the lighter particles from the heavy particles comprising, an elongated deck having its longitudinal axis disposed at an inclination to the vertical, means for rapidly and smoothly longitudinally reciprocating said deck to avoid imparting a jerking motion to an abrupt stoppage of movement of said deck, said deck being porous, means for forcing air upwardly through said deck, walls of considerable height extending upwardly from the longitudinal edges of said deck, a wall extending across the lower end of said deck and mounted for vertical adjustment to prevent the escape of material from the lower end of said deck until a bed of predetermined depth has been created on said deck, walls converging towards the center of said deck adjacent the upper end thereof and terminating in an outlet opening, a closed outlet passageway communicating with said outlet opening with said porous deck constituting the bottom of said passageway, said passageway at the upper end of said deck being open to permit material traveling through said passageway to escape from the upper end of the deck, the top closure of said passageway being in the form of a skimmer bar the inner end of which is horizontally pivotally mounted, the bottom face of said bar being formed to present a convex surface to the air entering upwardly through the porous bottom of said passageway, and means to feed the intermixed material to said deck at a point intermediate its length.

7. A construction such as defined in claim 6 wherein, means is provided for directing all of the air which passes through said deck other than through the bottom of said outlet passageway in a direction toward the lower end of said deck, and said skimmer bar suspension and curvature being such that the under side of said bar is disposed nearest the bottom of said passageway at a point adjacent but short of the open outer end thereof.

8. A construction such as defined in claim 6 wherein, the suspension and curvature of the skimmer bar is such that for the greater portion of the length of the outlet passageway said skimmer bar causes the air entering said passageway through the bottom thereof to be deflected toward the inlet end of the passageway with the force of said air progressively increasing in a direction towards the open outlet end of said passageway, and said skimmer bar deflecting the air entering said passageway adjacent the open outlet end thereof in a direction toward said open end to assist in the discharge of material from said open end.

9. In an apparatus for separating and separately collecting particles in a mass in accordance with their differences in specific gravities, an inclined porous deck devoid of riffles on its surface, means to reciprocate said deck in line with its inclination, walls extending along the sides of said deck and at the upper end of the deck converging to define a restricted discharge throat and acting to concentrate the heavier particles of said mass under volumetric mass pressure to cause their movement up said deck toward and through said throat discharge in response to deck impetus, an automatically operable curved plate overlying a porous portion of said deck and pivotally mounted for vertical movement in respect thereto, said plate confining said throat discharge by being positioned so that the heavier particles of the mass must pass beneath the plate to discharge through said throat, means for maintaining a continuous air current upwardly through said deck to stratify said mass and to impinge against the curved surface of said plate, said plate curved surface acting to divide the air current which is directed against it into two streams one of which moves in a direction to facilitate the discharge of heavy particles through the throat discharge and the other of which acts to propel lighter particles away from said throat discharge, and vertically adjustable means at the lower end of said deck acting to maintain a predetermined depth of stratified mass on said deck and to control the discharge of the lighter particles of said mass from the lower end of said deck.

10. An apparatus for separating and separately collecting mixed particles of different specific gravities in a mass comprising, an inclined air pervious deck mounted for uniform and rapid reciprocation in line with said deck inclination, said deck being provided with a roughened surface devoid of riffles, confining walls at and extending along the sides of said deck, said walls at the upper end of said deck slanting inwardly and converging but having their ends stopping short of meeting, said wall construction being for the purpose of promoting contiguity of the heavy particles of the mass and to define between the separated ends of said inwardly slanting walls a restricted throat discharge, said throat discharge being elongated and having substantially parallel side walls and a pervious bottom, means for projecting a continuous air current upwardly through said deck and said throat discharge bottom, an arcuate shaped automatic particle and air controlling plate pivotally disposed between said throat discharge side walls for vertical movement in respect thereto and against which air passing through the bottom of said throat discharge is directed and divided into two separate streams one of which moves outwardly through said throat discharge to facilitate the expulsion therethrough of the lower stratum of the mass and the other of which moves longitudinally over said deck toward the lower end thereof, whereby the mass of mixed particles on said deck will be stratified and constrained, except for the lowermost stratum, against other than movement down the inclined deck towards the lower end thereof, and vertically adjustable means carried by said deck and oppositely arranged in respect to said throat discharge for controlling the depth of the mass on said deck to attain a predetermined pressure upon and rate of discharge of the lower stratum upwardly of said deck and through said throat discharge.

11. The process of separating the light from the heavy particles of a mass of intermixed divided materials the particles of which are of different specific gravities, comprising, continuously feeding to a longitudinally inclined pervious deck a stream of said mass at a point intermediate the length of said deck, confining said material against escape from the sides of said deck, agitating and stratifying the material on said deck by simultaneously rapidly reciprocating said deck in the direction of its inclination and forcing air upwardly through said deck and the material thereon, permitting the upper strata of light material to move down said deck in response to the force of gravity but positively obstructing the passage of any of said material from the lower end of said deck until a bed of predetermined thickness of said material is established on that area of the deck between the point of material feed and the lower end of said deck with said bed being deepest at the lowermost end of the deck and tapering in thickness upwardly of said deck to the point of material feed to the deck, making the inclination of said deck and the speed of reciprocation thereof and the amount of air forced upwardly through the deck such that the heavy underlying strata composed of heavy particles will not move up said deck until they are forced into close relationship with one another and into frictional engagement with the deck by the force and weight exerted upon them by the said bed composed of the lighter particles, progressively narrowing the width of the stream of heavy particles on said deck as said particles move up the deck to thereby promote crowding and contiguity of the heavy particles, and thereafter permitting the heavy particles to discharge at deck level from the upper end of said deck as they reach said deck end by travel upwardly of the deck in response to the reciprocatory movement thereof through their frictional engagement with one another and with the deck.

12. The process of separating the light from the heavy particles of a mass of intermixed divided materials the particles of which are of different specific gravities comprising, continuously feeding to a longitudinally inclined pervious deck the upper surface of which is free of any obstruction extending in a direction transverse the deck a stream of said mass at a point intermediate the length of said deck, confining said material against escape from the sides of said deck, agitating and stratifying the material on said deck by simultaneously rapidly reciprocating said deck in the direction of its inclination and forcing air upwardly through said deck and the material thereon, permitting the upper strata of light material to move down said deck in response to the force of gravity but positively obstructing the passage of any of said material from the lower end of said deck until a bed of predetermined thickness of said material is established on that area of the deck between the point of material feed and the lower end of said deck with said bed being deepest at the lowermost end of the deck and tapering in thickness upwardly of said deck to the point of material feed to the deck, making the inclination of said deck and the speed of reciprocation thereof and the amount of air forced upwardly through the deck such that the heavy underlying strata composed of heavy particles will not move up said deck until they are forced into close relationship with one another and into frictional engagement with the deck by the force and weight exerted upon them by the said bed composed of the lighter particles, progressively narrowing the width of the stream of heavy particles on said deck as said particles move up the deck to thereby promote crowding and contiguity of the heavy particles, and permitting the heavy particles to discharge at deck level from the upper end of said deck as they reach said deck end by travel upwardly of the deck in response to the reciprocatory movement thereof through their frictional engagement with one another and with the deck.

13. A process for pneumatically separating a mass consisting of heavy refuse particles and lighter particles by feeding said mass on a rapidly reciprocating wide pervious bed through which air is forced upward through said mass to cause the separation of part of said heavy refuse from the lighter particles, and separating the remaining unseparated heavy refuse particles by passing them through a transversely contracted passageway in respect to said wide bed and simultaneously forcing air upward in said passageway and causing the air to simultaneously flow in two directions within the passageway, one in the direction of the outlet end of the passageway to force said refuse out of the passageway and the other air inwardly within said passageway to force inwardly the lighter particles causing them to mix with said mass, whereby a clean mass of lighter products is the final result.

14. The process of separating from a mass those materials having different specific gravities comprising, feeding said mass on to a pervious deck inclined longitudinally at an angle to the horizontal and having a roughened surface of a character to provide no obstruction or disruption to the free passage over the deck of the material making of said mass, continuously directing the feeding of the mass to said deck at a point intermediate the ends thereof and simultaneously rapidly longitudinally reciprocating the deck, forcing air from the bottom side of said deck upwardly therethrough, confining said material against escape from the side edges of said deck and preventing the discharge of material from the lower end of said deck until the mass on said deck has created a bed of a predetermined thickness, continuing the feed of the mass to said deck and the reciprocation thereof until the heavier materials of the mass have settled into contact with the deck and are moved up the incline of the deck due to said deck reciprocation, crowding the heavy material adjacent the upper end of the deck to place the particles thereof into close and contiguous relationship, causing said heavy crowded particles to escape on the upper end of said deck through a restricted elongated outlet opening, creating at the entry of said outlet opening a current of air traveling in a direction inward from said opening, continuing the feed of the mass to the deck and the reciprocation thereof until the weight of the crowded heavy material by its frictional contact with the deck is moved upwardly with sufficient force to overcome the force of said current of air and thereby enter said outlet opening, aiding the discharge of the heavy material after it has passed through said outlet opening by subjecting it to the force of an outwardly moving current of air, and throughout said operations permitting the lighter material to flow down said deck in response to the force of gravity and to discharge from the top of said bed over the lower end of the deck.

FRANK E. WOOD,
*Executor of Estate of Henry M. Sutton, Deceased.*